(12) United States Patent
O'Connor et al.

(10) Patent No.: US 7,332,012 B2
(45) Date of Patent: Feb. 19, 2008

(54) MULTI-STAGE FILTERING APPARATUS

(75) Inventors: Christopher J. O'Connor, Charlotte, NC (US); James R. Kearney, Sr., Shepherdsville, KY (US); Keiron P. O'Connell, Louisville, KY (US)

(73) Assignee: AAF-McQuay Inc., Louisville, KY (US)

( * ) Notice: Subject to any disclaimer, the term of this patent is extended or adjusted under 35 U.S.C. 154(b) by 292 days.

(21) Appl. No.: 10/895,703

(22) Filed: Jul. 21, 2004

(65) Prior Publication Data

US 2006/0016163 A1    Jan. 26, 2006

(51) Int. Cl.
*B01D 39/00* (2006.01)

(52) U.S. Cl. ............................. 55/493; 55/480; 55/481; 55/484; 55/490; 55/501; 55/502; 55/508; 55/516; 55/517; 55/DIG. 31

(58) Field of Classification Search .................. 55/480, 55/481, 484, 490, 493, DIG. 31, 501, 502, 55/508, 516, 517
See application file for complete search history.

(56) References Cited

U.S. PATENT DOCUMENTS

| | | | |
|---|---|---|---|
| 3,350,862 A * | 11/1967 | Nutting | ........................ 55/493 |
| 3,434,269 A | 3/1969 | Hyatt | |
| 3,581,476 A | 6/1971 | Rivers | |
| 3,593,503 A | 7/1971 | Andrews | |
| 3,608,283 A | 9/1971 | Huglo | |
| 3,626,668 A | 12/1971 | Cardiff | |
| 3,630,008 A * | 12/1971 | Revell et al. | .................. 55/493 |
| 3,693,328 A | 9/1972 | Paucha | |
| 3,740,934 A | 6/1973 | Shuler | |
| 3,788,046 A | 1/1974 | Kaeppler et al. | |
| 3,789,589 A | 2/1974 | Delany et al. | |
| 3,816,984 A | 6/1974 | Neumann | |
| 3,993,464 A | 11/1976 | Pelabon | |
| 3,999,969 A | 12/1976 | Shuler | |
| 4,023,944 A * | 5/1977 | Beane | ......................... 55/481 |
| 4,124,361 A * | 11/1978 | Revell | ......................... 55/493 |
| 4,141,704 A | 2/1979 | Berglund | |
| 4,217,122 A * | 8/1980 | Shuler | ......................... 55/480 |
| 4,251,245 A | 2/1981 | Reynolds | |
| 4,266,956 A | 5/1981 | Revell | |
| 4,457,336 A | 7/1984 | Allan et al. | |
| 4,486,204 A | 12/1984 | Marijnissen et al. | |
| 4,498,914 A | 2/1985 | Ericksen | |
| 4,521,234 A | 6/1985 | Peebles, Jr. et al. | |

(Continued)

FOREIGN PATENT DOCUMENTS

DE          3502971 A1     5/1986

(Continued)

OTHER PUBLICATIONS

Markus Chalilow, Offrez-Vous Un Vrai Bras Droit, Special Transports VII, Jun. 3, 2004, vol. 23, Revue Automobile, France.

Primary Examiner—Matthew Savage
Assistant Examiner—Minh-Chau T. Pham
(74) Attorney, Agent, or Firm—Steve A. Witters; Middleton Reutlinger

(57) ABSTRACT

A filtering apparatus having a filter retrieval apparatus, an integrated jib, and a clamping assembly for providing a seal between a filter and a cabinet.

14 Claims, 20 Drawing Sheets

U.S. PATENT DOCUMENTS

| | | |
|---|---|---|
| 4,701,196 A | 10/1987 | Delany |
| 4,773,922 A | 9/1988 | Ross et al. |
| 4,790,865 A | 12/1988 | DeMarco |
| 4,827,901 A | 5/1989 | Jackson et al. |
| 4,983,190 A | 1/1991 | Verrando et al. |
| 5,221,302 A | 6/1993 | Sheehan |
| 5,332,409 A * | 7/1994 | Dralle .................. 55/484 |
| 5,399,180 A * | 3/1995 | Kopp ..................... 55/493 |
| 5,447,544 A | 9/1995 | Birdwell |
| 5,464,461 A * | 11/1995 | Whitson et al. ........ 55/480 |
| 5,549,723 A * | 8/1996 | Terry .................... 55/493 |
| 5,593,470 A | 1/1997 | Shagott et al. |
| 5,665,145 A | 9/1997 | Goodman et al. |
| 5,669,947 A | 9/1997 | Diachuk |
| 6,174,343 B1 * | 1/2001 | Bloomer ................. 55/385.3 |
| 6,245,160 B1 | 6/2001 | Burns, Jr. et al. |
| 6,264,713 B1 * | 7/2001 | Lewis, II ................ 55/481 |
| 6,298,672 B1 | 10/2001 | Valicoff, Jr. |
| 6,431,805 B2 | 8/2002 | Lanciaux, Jr. |
| 6,569,217 B1 | 5/2003 | DeMarco |
| 6,974,491 B1 * | 12/2005 | Kendall .................. 55/493 |
| 2002/0072020 A1 | 6/2002 | Crane et al. |
| 2003/0074872 A1 * | 4/2003 | Lawlor, Sr. ............. 55/493 |

FOREIGN PATENT DOCUMENTS

| | | |
|---|---|---|
| DE | 10349826 A1 | 5/2004 |
| EP | 0 318 417 A3 | 5/1989 |

* cited by examiner

MULTI-STAGE FILTERING APPARATUS

BACKGROUND

1. Field of the Invention

The present invention relates to a Multi-stage Filtering Apparatus. More specifically, the present invention is a Multi-stage Filtering Apparatus having a novel filter clamping mechanism and an integrated jib within a fan cabinet.

2. Description of the Related Art

Air filtering systems are generally utilized for filtration of enclosed spaces in order to remove contaminants from the air stream and provide clean air for respiration. These systems generally consist of two types of systems: a first type which pushes positive pressure air flow through a filtration bank and a second type which pulls negative pressure air flow through the filtration bank. These filtration banks generally include a single filter size in order to filter out contaminants.

Recent biological attacks attempted and carried out through the United States Postal System have created a need for a filtration system able to filter out dangerous contaminants including harmful nuclear, biological, chemical, or other particulate or contaminants wherein filter by-pass is eliminated. Since such contaminants are so minute in size, it is extremely critical that air leakage around the filters be stopped. When air leaks about the perimeter of the filter, the harmful and minute particles may be are entrained in the air stream and delivered to the enclosed space in the air supply. However, eliminating by-pass about a filter bank is extremely difficult.

An additional problem exists with filtration systems in that it is necessary to remove fan motors from air handling devices, for example during replacement. However, when these motors are positioned within a cabinet they are difficult and potentially dangerous to handle for workers.

Still an additional problem with existing filtration systems is that filters are difficult to remove from filter racks or banks. However, filters need to be removed and replaced on a regular basis in order to maintain proper filtration and airflow through to an enclosed volume.

Given the foregoing deficiencies, it will be appreciated that a multi-stage filtering apparatus is needed for filtering contaminants from an air supply and providing such air supply for safe use. In addition, a means for handling the fan motors within a cabinet is needed in order to safely position the motors during removal and replacement. Finally an apparatus is needed providing aid for removal of filters from a filtration bank.

SUMMARY OF THE INVENTION

With regard to the foregoing, the present invention eliminates the oversights, difficulties, and disadvantages of the prior art by providing a multi-stage filtering apparatus.

An object of the present invention is to provide multi-stage filtering apparatus having a clamping assembly to inhibit air leakage around at least one filter bank.

Another object of the present invention is to provide multi-stage filtering apparatus for removing harmful nuclear, biological, chemical, or other particulate from an air supply where zero bypass of at least one filter is a necessity.

An additional object of the present invention is to provide a fan housing having an integrated jib for removal of a fan motor from within the housing.

According to a first embodiment, a multi-stage filtering apparatus is provided having a novel clamp assembly comprising a clamp slidably positioned on and operably engaging a slide, an adjustment bolt threadably connected to the slide wherein rotation of the adjustment bolt causes a first linear motion of the slide, and wherein the first linear motion causes a second translation motion of the clamp so that the clamp for engaging a filter.

A second embodiment of the present invention comprises an integrated jib for a fan-housing cabinet having an upper surface, a lower surface and a plurality of sides defining the cabinet, a first jib retainer bracket mounted adjacent an opening in one of the plurality of sides, a second jib retainer disposed within the fan housing cabinet, the first and second jib retainer disposed to position the jib above a fan motor within the fan-housing cabinet.

DETAILED DESCRIPTION

Referring now in detail to the drawings, wherein like numerals indicate like elements throughout the several views, there is shown in FIGS. 1 through 20 various aspects of an illustrative multi-stage filter apparatus. According to one embodiment, a filter clamping assembly filtering apparatus for removing harmful nuclear, biological, chemical, or other particulate from an air supply where zero bypass of at least one filter is a necessity. According to a second embodiment, the present invention provides an integrated jib for a fan housing cabinet. According to a third embodiment the present invention comprises a filter retrieval apparatus.

Figure 1:
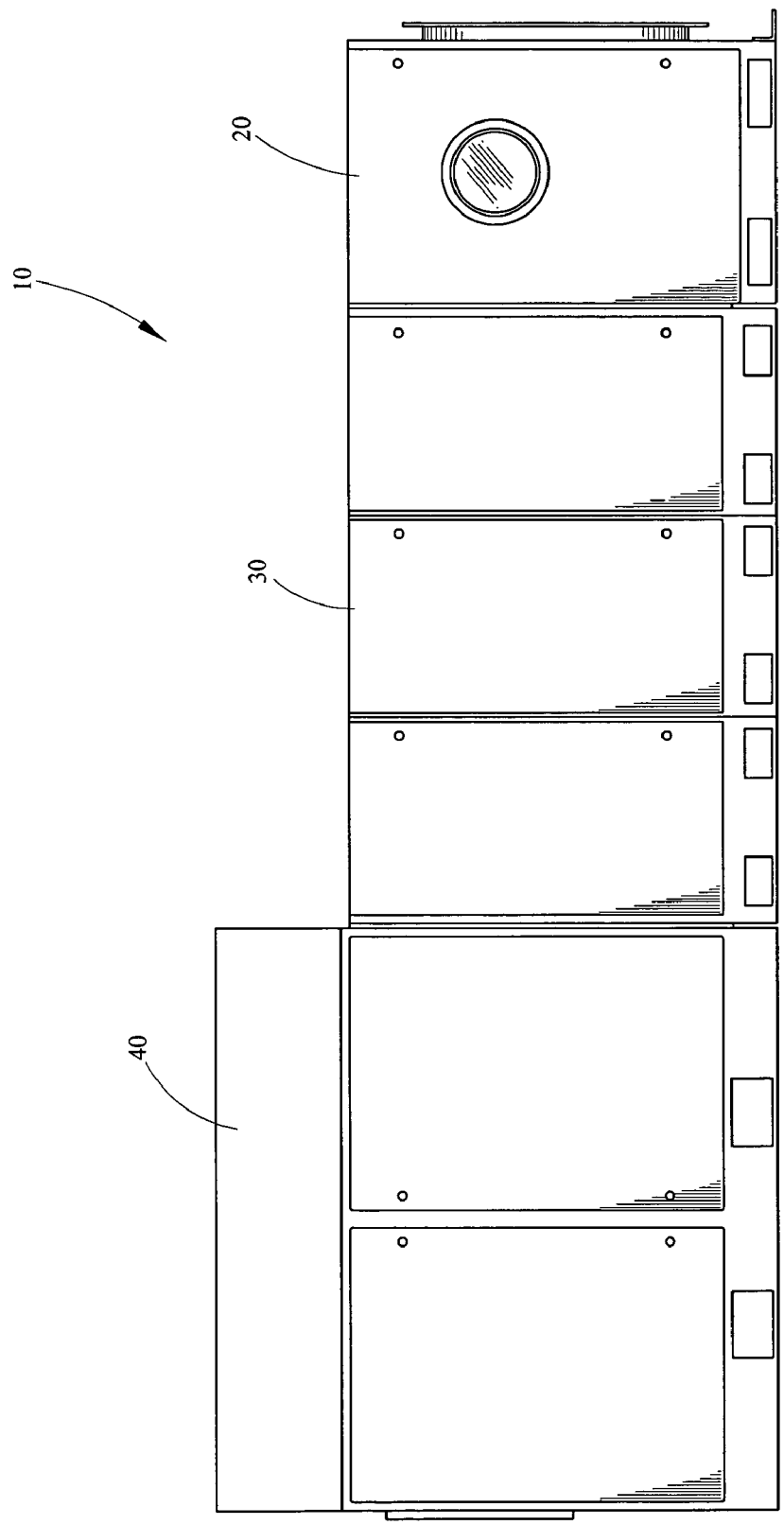
FIG. 1 is a side view of a filtering system of the present invention comprising three cabinets.
Figure 20:
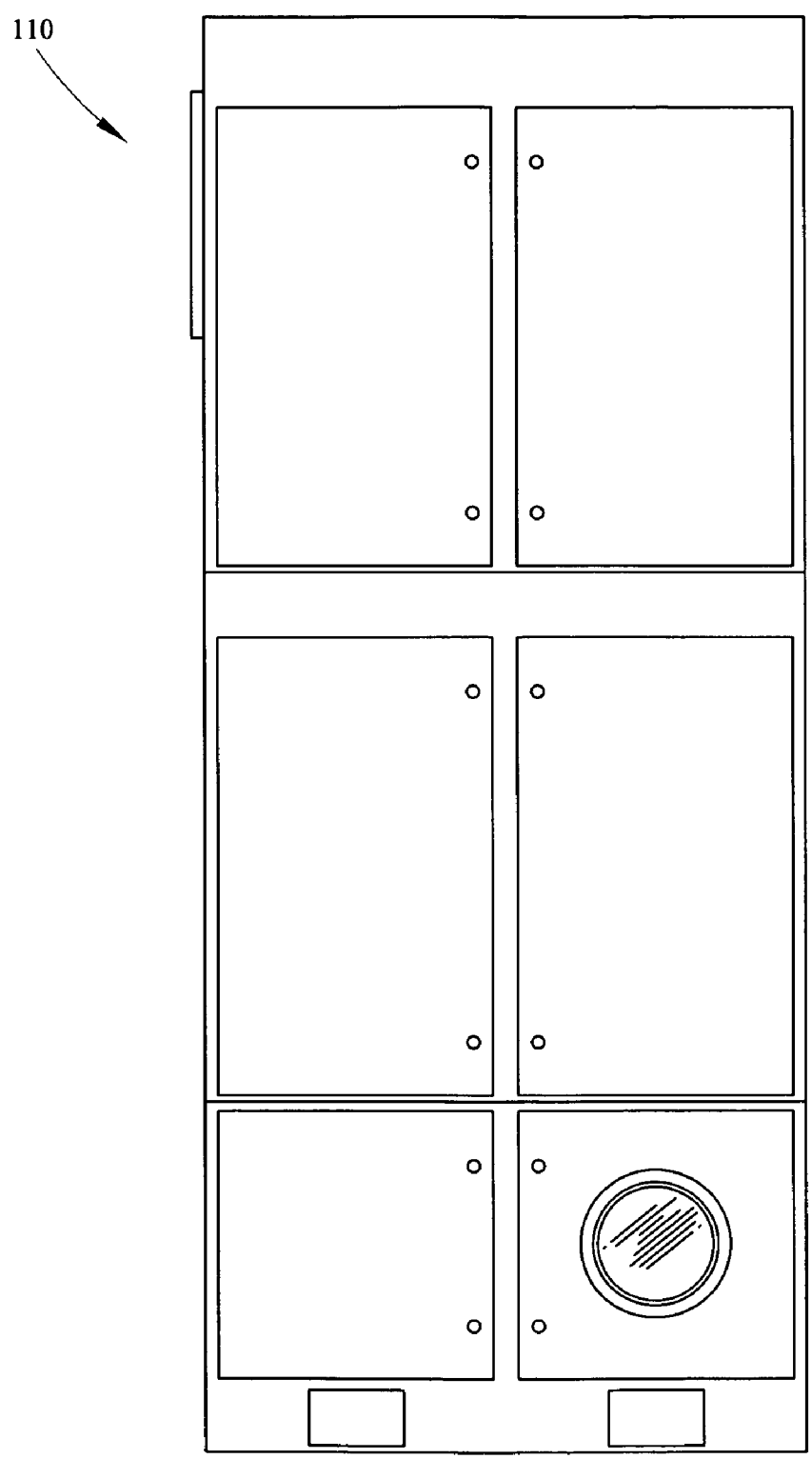

Referring initially to FIG. 1, the multi-stage filtering apparatus 10 is depicted including a multiple cabinet system for filtration. More specifically, according to the illustrative embodiment shown, the filtering apparatus 10 comprises a three cabinet system including a inlet cabinet 20, a filtration cabinet 30, and a fan-housing cabinet 40 may be horizontally oriented, as described herein, or a vertically oriented multi-stage filtering apparatus 110, as shown in FIG. 20. For purpose of this description, orientation of the filtering apparatus 10 is defined with respect to the movement of airflow through the filtration apparatus 10. Horizontal orientation of the filtering apparatus 10 means that the direction of airflow through the cabinets is substantially horizontal, while vertical orientation of the filtering apparatus is defined by vertical airflow through the filtering apparatus. The embodiment shown and described throughout the various views is horizontally oriented however, it should be clear to one of skill in the art that the apparatus may be vertically oriented as shown in FIG. 20 by multi-stage filter apparatus 110. The system may be designed for various CFM ratings and may further include a cooing system such as a chilled water cooling system or a direct expansion cooling system.

The exemplary filtering apparatus 10 includes three cabinets; however various designs may include any number of cabinets. Generally, the first cabinet 20 provides an air inlet for the filtering apparatus 10 while the second cabinet 30 provides a filtration function. The third cabinet 40 provides a housing for a fan generally indicated by 42 and motor 43 (FIG. 15) therein for providing a negative pressure upstream of the third cabinet 40 through the inlet cabinet 20 and the filtration cabinet 30. Alternatively, the fan-housing cabinet may be operatively positioned upstream of the filtration cabinet 30 thereby placing a positive pressure on the filtration cabinet 30. The filtering apparatus 10 may be positioned, for instance, adjacent a sorting machine (not shown) in order to filter air particulate generated within the sorter.

Figure 2:
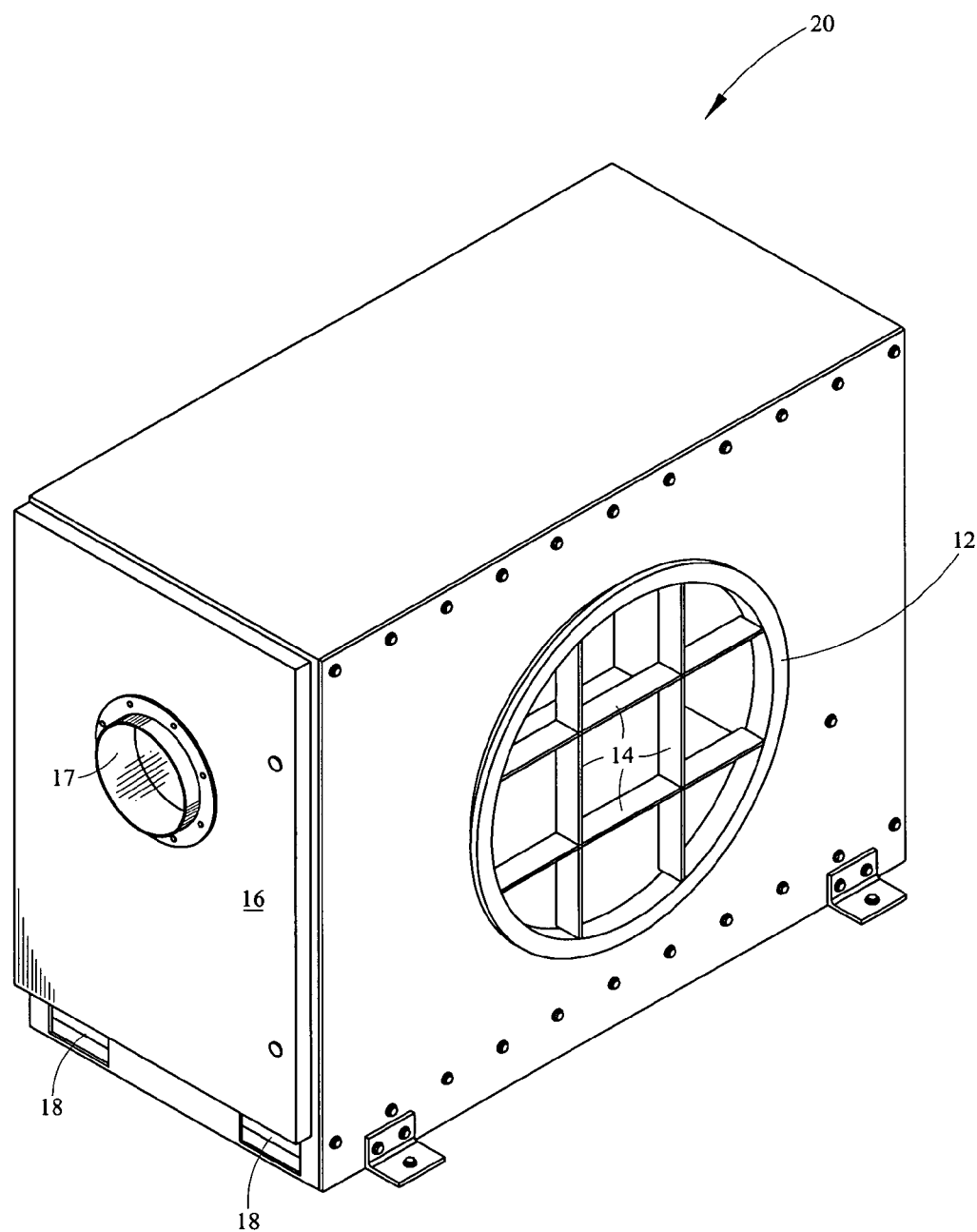
FIG. 2 is a side perspective view of the inlet cabinet of FIG. 1.

With reference now to FIG. 2, the inlet cabinet 20 is shown in a side perspective view generally having an upper surface, a lower surface and four side surfaces defining the inlet cabinet or enclosure having an inlet 12 and outlet 19. At least one side including the air inlet 12 has a safety grating 14 applied over the air inlet 12. The air inlet 12 is shown as circular in shape and may be of varying diameter depending on the amount of airflow being pulled through the system 10. However, the shape of the inlet 12 may comprise alternate geometric configurations. Due to the size of the inlet 12 in large applications the safety grating 14 may be positioned at the inlet 12 to inhibit workers from falling into the inlet cabinet 10 during operation of the filtration assembly. As further seen in FIG. 2, a door 16 is included on the cabinet to access the interior portion thereof including a viewing port 17 allowing postal workers to view the interior of the inlet cabinet during operation to check for debris and material therein. The viewing port 17 is substantially circular in shape, but may include various geometries, and is disposed normal to the flow of air through the inlet cabinet 20 so that workers may view any debris entrained in the airflow passing through the cabinet 20 and make a determination when cleaning of the inlet cabinet 20 is necessary. Further, as shown in FIG. 2, at the bottom of the cabinet are forklift pockets 18 which allow for use of a forklift in moving and placing the inlet cabinet 20 adjacent the filtration cabinet. The forklift pockets 18 are used in each of the inlet cabinet 20, filtration cabinet 30, and fan housing or cabinet 40. However, the cabinets 20, 30 and 40 may not be limited to utilization of forklift pockets but instead may comprise a variety of legs or other support structures and designs.

Figure 3:
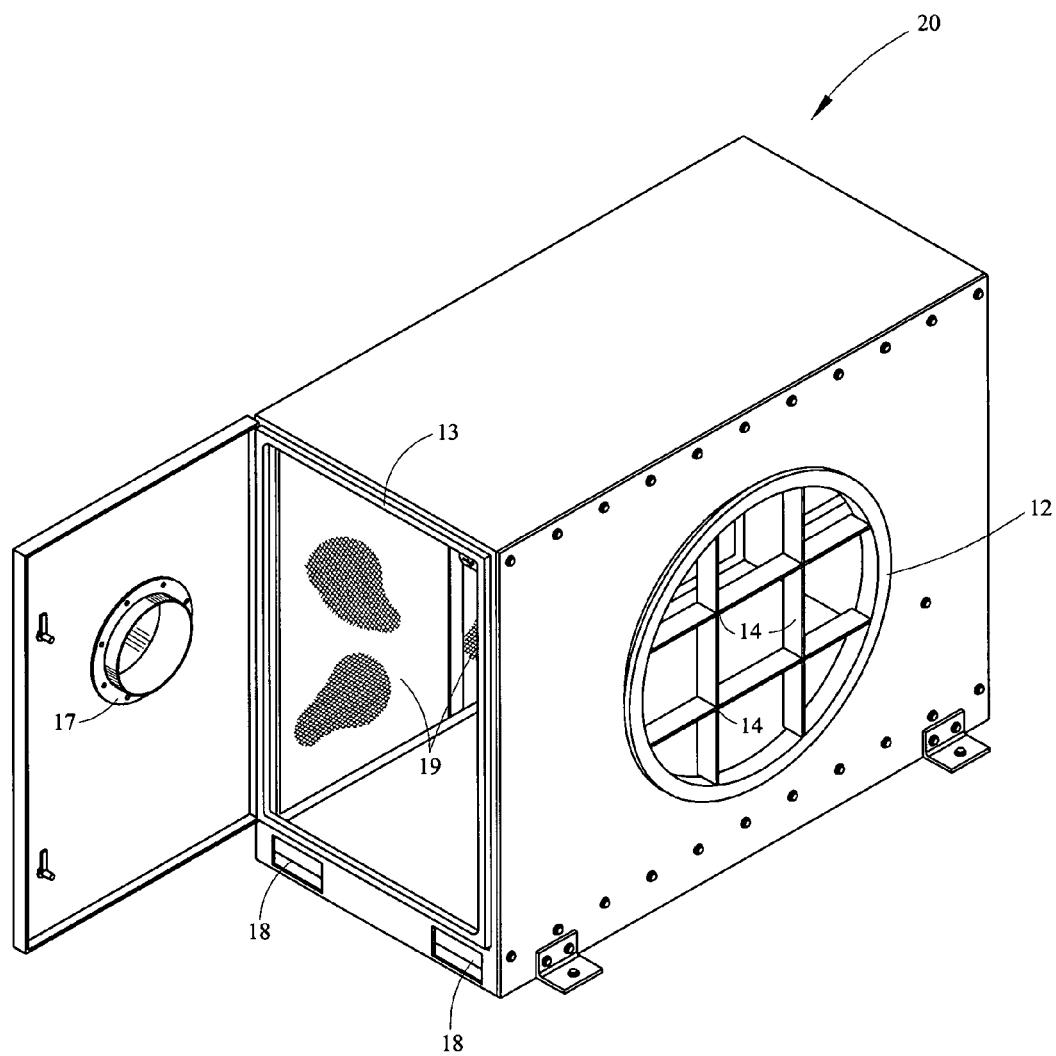
FIG. 3 is side perspective view of the interior of the inlet cabinet of FIG. 2.

Referring now to FIG. 3, an interior view of the inlet cabinet 20 is shown with the cabinet door 16 ajar revealing the interior of the viewing port 17. Opposite the air inlet 12 is a small mesh screen 19 having two functions. First, the screen or mesh 19 is utilized to diffuse air flow moving from the inlet cabinet 20 to the filtration cabinet. Second the mesh screen 19 serves to remove large particles and debris from entrainment thus preventing such particulate from entering the filtration cabinet 30. Thus the screen mesh 19 is fastened against an inlet side of the filtration cabinet 30 by a connecting flange or other fastener assembly.

As further shown in FIG. 3, the inlet cabinet utilizes a knife edge seal 13 around the door opening so that the seal is engaged when the door is closed. The knife edge seal 13 provides a high integrity seal between the door opening and the door of the inlet cabinet. Such knife edge seal is also utilized on the filtration cabinet 30. Further, as shown in the upper right hand corner of the door opening, a switch 15 is positioned which may be in electrical communication with the computer or other safety device to indicate to an operator that the inlet cabinet door has been opened. This switch 15 may be in electrical communication with a circuit to inhibit operation of the filtration apparatus 10 when a door to a cabinet is open.

Figure 4:
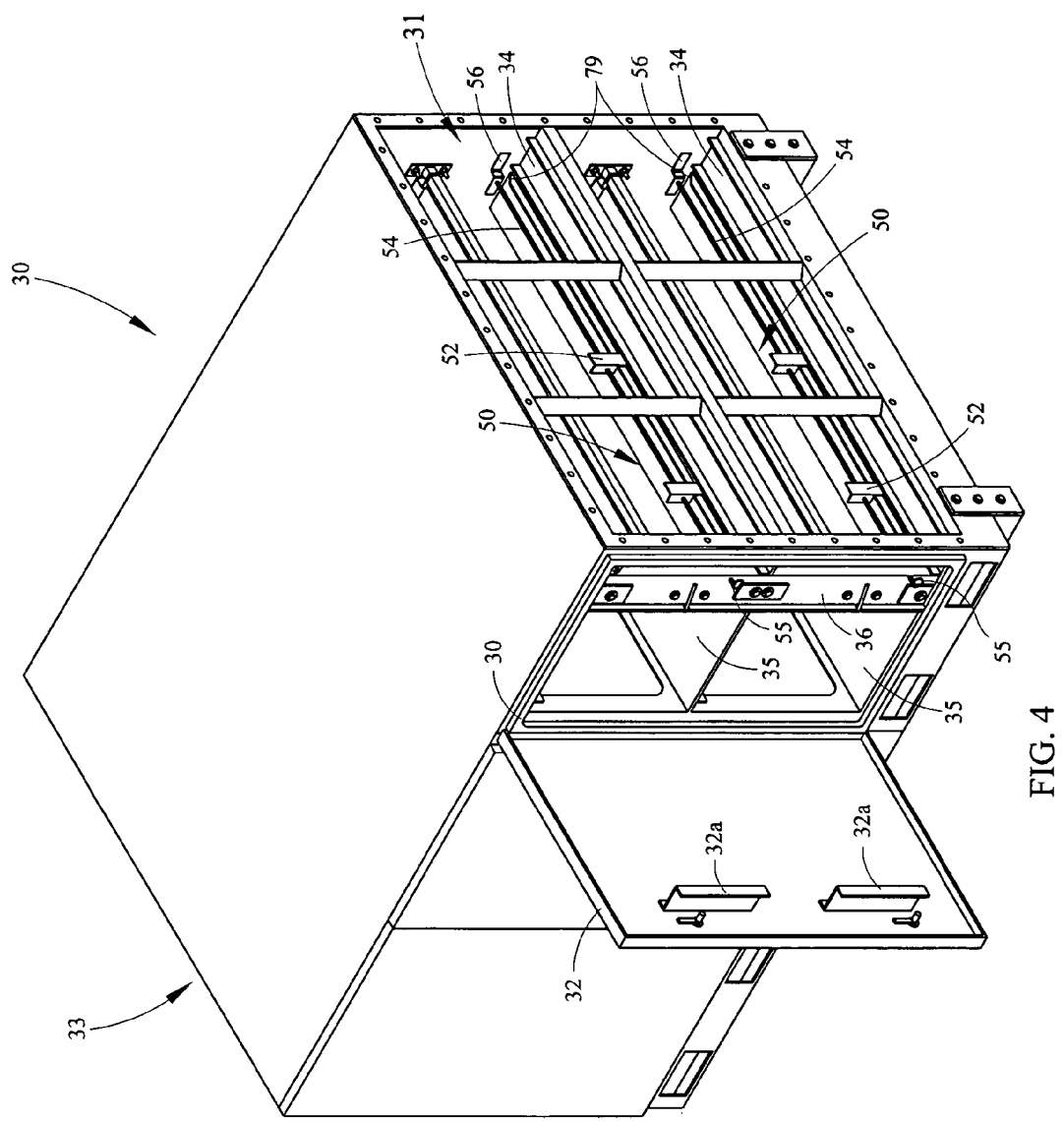
FIG. 4 is a side perspective view of the second filtering cabinet of FIG. 1.

Referring now to FIG. 4, the filtration cabinet 30 is defined by a top surface, a lower surface, and a plurality of sides wherein at least one of the sides defines an inlet 31 and an opposite side defines an outlet 33. The filtration cabinet 30 is shown including at least one cabinet door 32, and preferably three doors, one of which is depicted in the open position adjacent the inlet portion of the filtration cabinet 30. The inlet opening 31, at the right hand end of the cabinet 30 is abutted to the inlet cabinet screen 19 (FIG. 3) and connected by, for instance, flanged connection shown utilizing a plurality of bolt apertures. Within the first door 32 of the filtration cabinet 30 are two filter tracks 34, 35 shown separated by a vertical support 36 extending from the upper portion of the filtration cabinet 30 to a lower portion of the filtration cabinet 30 and which are located at the top and bottom of the cabinet 30. Adjacent the cabinet inlet 31 at upper and lower positions are the first tracks 34 which receive, for instance, a 4" pleated filter known in the art as a prefilter, or first-stage filter. The first tracks 34 have an open end proximate the door 32 for slidably positioning of a filter and the first tracks 34 include an upper filter track and a lower filter track which extend across the depth of the filtration cabinet from adjacent the door 32 of the cabinet 30 to the opposed wall of the cabinet 30, each first track 34 accepting a first-stage filter. The pleated first-stage filter may be a 30% efficient dust spot filter.

Figure 5:
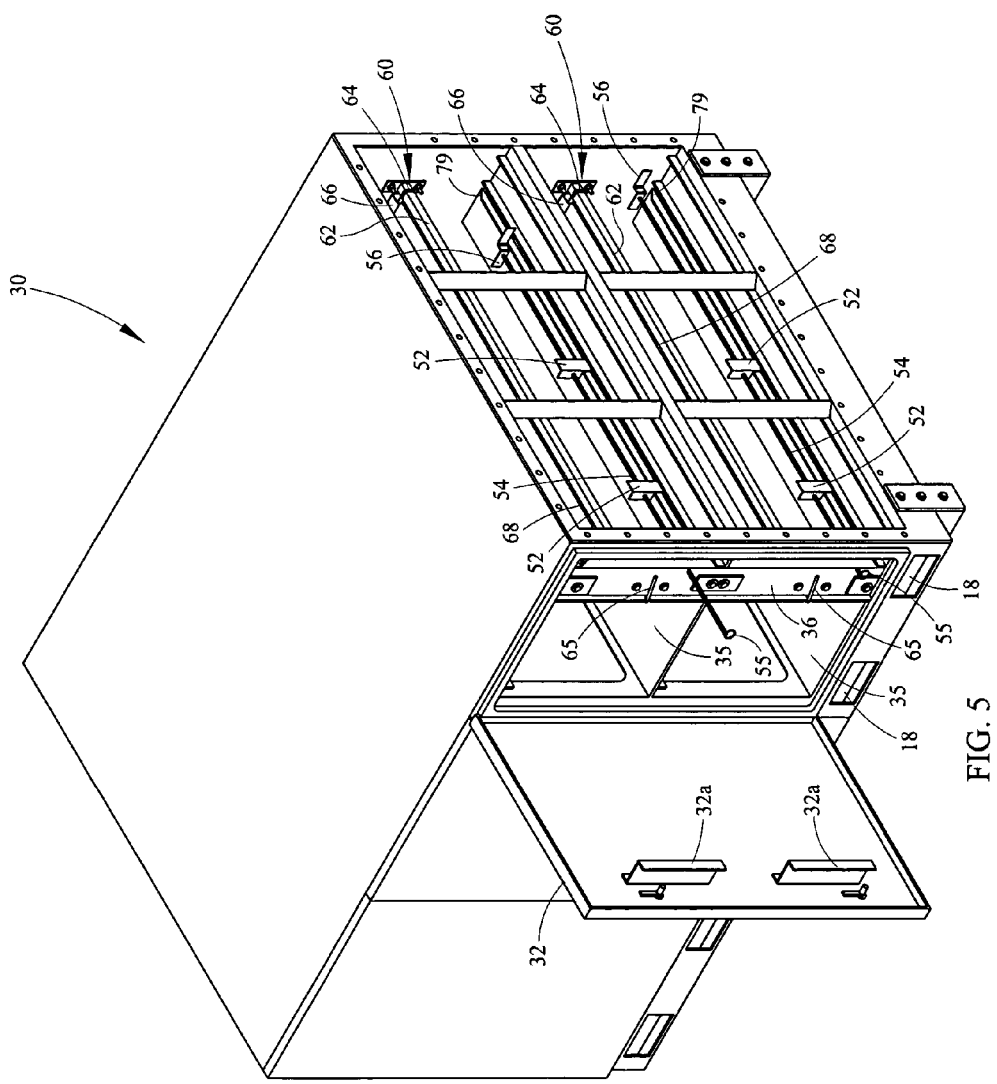
FIG. 5 is a perspective view of the filtering cabinet of FIG. 4 depicting the retrieval rod.

With reference now to FIGS. 4 and 5, a filter retrieval apparatus 50 is shown for use with upper and lower first tracks 34. The filter retrieval apparatus 50 comprises a plurality of rod supports 52 extending vertically adjacent portions of the upper and lower tracks 34. The rod supports 52 may be formed of various materials including for instance, steel or other metals, and have a retrieval rod or bar 54 extending laterally through the rod supports 52 and slidably disposed therein from the door side of the cabinet 30 to the opposed wall of the filtration cabinet 30. The rod supports 52 are designed to inhibit interference with the first-stage filter during installation and removal which is very important for maintenance as well as inhibiting damage to the filter or performance thereof. As shown in FIG. 5, at a first end of the rod 54 proximate the door 32 is a ring or pull 55 for grasping and pulling the rod 54 laterally through the rod supports 52. At the opposed end of the rod 54, a metal finger 56 is located which is positioned between a first-stage filter (not shown) and the cabinet sidewall opposite the door 32. When the rod 54 is pulled at the ring 55, the finger 56 moves laterally toward open end of the tracks 34. As the finger 56 moves, the filters are moved toward the open end of tracks 34. Thus, the first-stage filters are removed from the filtration cabinet first tracks 34, for example, for cleaning or replacement. The rod 54 may be pushed into the cabinet 30 in order to accept new or cleaned filters in the first tracks 34a,34b. This assembly may be utilized for both the upper and lower first track portions 34.

Figure 6:
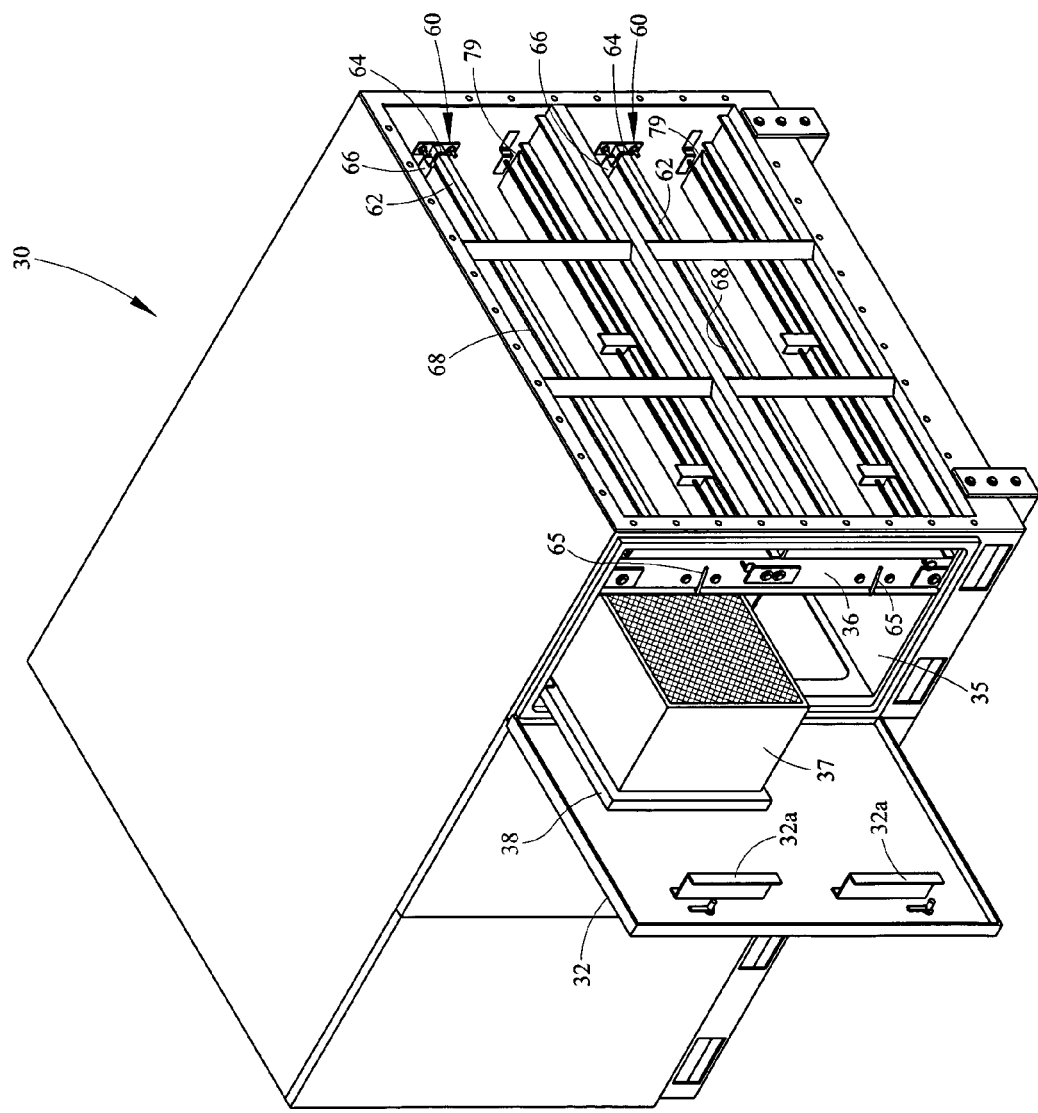
FIG. 6 is perspective view of the interior of a compartment of the filtering cabinet of FIG. 4 with a secondary filter therein.

Referring now to FIGS. 5 and 6, to the left of the vertical support 36 extending across the door opening are upper and lower second-stage tracks 35 providing a position for a secondary or second-stage filter 37. The second-stage tracks 35 may be for example about 12" wide and may therefore fit a filter 37 having a width of about 12", although this dimensional description is exemplary and the dimensions may change. The exemplary filters 37 may be 90-95% dust spot efficient and may be pleated utilizing a single header meaning the filters utilize a metal, plastic, or other synthetic framing 38 extending about one side of the second-stage filter 37. As shown in FIG. 6, a single header filter 37 is being installed in the unit with the header 38 adjacent the rear portion of the cabinet 30. As shown in the Figure, due to the header 38 extending about only one edge of the second-stage filter 37, the filter 37 will tilt toward the edge opposite the header 38 in order to compensate for the difference in dimension. The filter 37 may also comprise a gasket 38a extending along one side of the filter 37, preferably adjacent the cabinet 30.

Figure 7:
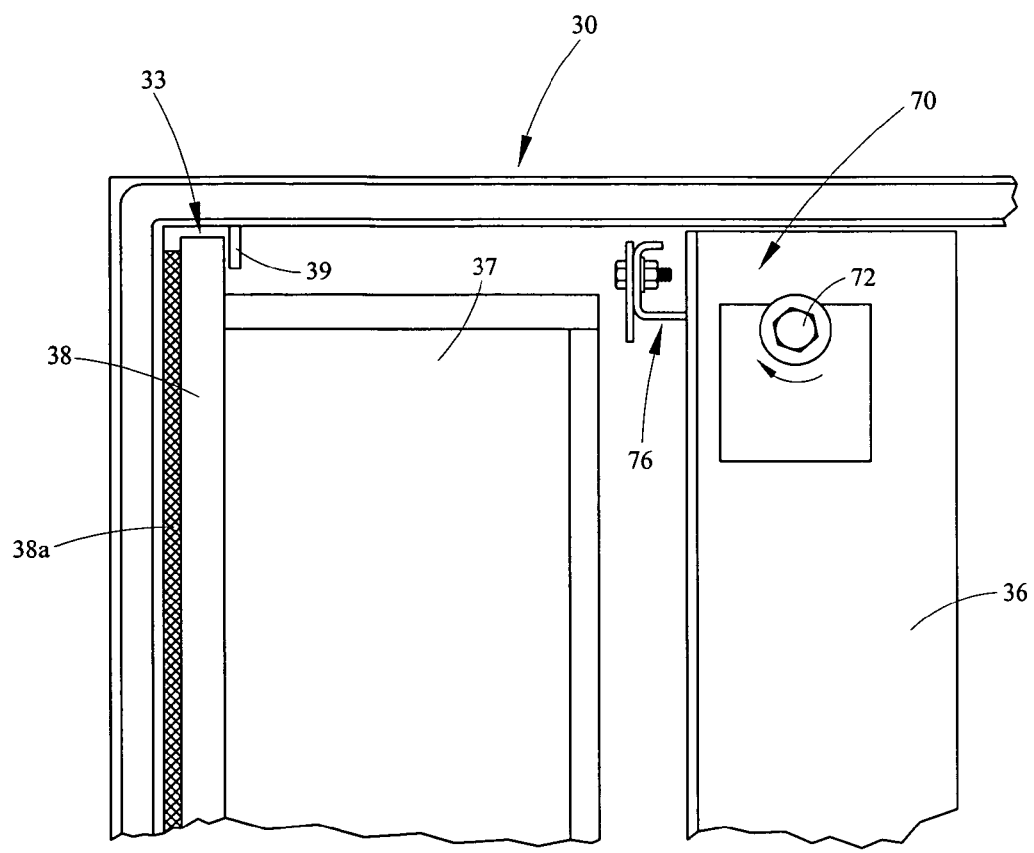
FIG. 7 is a side perspective view of a filter clamp assembly of the present invention; and, FIG. 8 is a side perspective view of the filter clamp assembly of FIG. 7 disposed in another position adjacent the secondary filter.

Referring now to FIG. 7, in order to compensate for the tilt of the filter 37 caused by the header 38 being disposed only on along one side of the filter 37, a header channel 33 is formed in each of the upper and lower second-stage tracks 35. The header channel 33 is shown defined by the cabinet 30 and at least one metal member 39 depending from the ceiling of the filtration cabinet 30 wherein a slot is formed for receiving the header 38. The member 39 inhibits tilting of the filter 37 in a clockwise direction, as shown in FIG. 7 when the second-stage filter 37 is initially installed. With the filter 37 and header 38 disposed in a substantially vertical position, the second-stage filter 37 is ready for sealing against the cabinet 30 in order to inhibit air leakage around the filter 37. In other words, the header channel 33 therefore aids in installation of the second-stage filters 37 as well as positioning of the filters in order to clamp the filters in place.

Referring again to FIGS. 5 and 6, a second-stage filter retrieval system 60 is depicted comprising a slide rod 62 upon which a sled 64 is slidably disposed. The slide rod 62 is may be some known structural shape such as for example a square tube and is generally formed of heavier gauge and stronger than the previously described first-stage retrieval rod 54 because the second-stage filter 37 generally is larger and heavier than the first-stage filter. The slide rod 62 extends between the vertical support 36 and an opposed cabinet sidewall. The sled 64 includes at least one finger 66 which is normally disposed opposite the door 32 between the cabinet 30 sidewall and the at least one second-stage filter 37. The second-stage filter retrieval system 60 further utilizes is a sled pull 68 which functions similarly to the first-stage retrieval bar 54 previously described and extends substantially parallel to the slide rod 62. The sled pull 68 includes a handle 65 at an end of the sled pull 68 proximate the door 32. When the handle 65 is pulled by a user, the at least one finger 66 begins moving with the sled 64 along the slide rod 62 toward the door 32. As the sled 64 and finger 66 begin moving along the slide rod 62, the filters 37 positioned on the second-stage track 35 are slidably removed from the cabinet 30.

Referring still to FIGS. 4-6, the handle 65 is shown disposed against the vertical support 36 by utilizing a notched portion in the vertical support 36. The notched portion allows for proper positioning of the handle 65 thereby inhibiting interference between the second-stage retrieval handle 65 and the door 32 of the filtration cabinet 30 when the door 32 is closed. The Figures further depict a filter locator 32a utilized for proper positioning of the first-stage filter upon closing of the filtration cabinet door 32. The locator 32a engages the first-stage filter upon closing of the door to ensure that the filters are properly seated for filtering.

Figure 8:
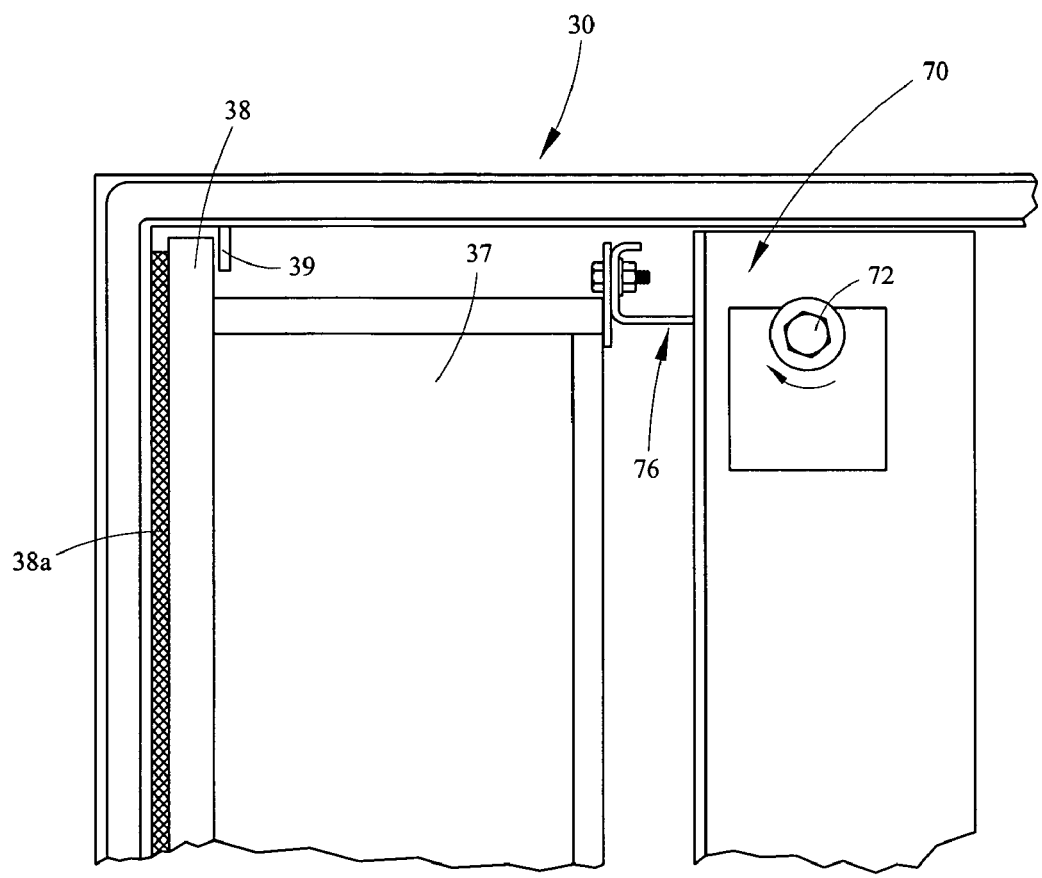
Figure 9:
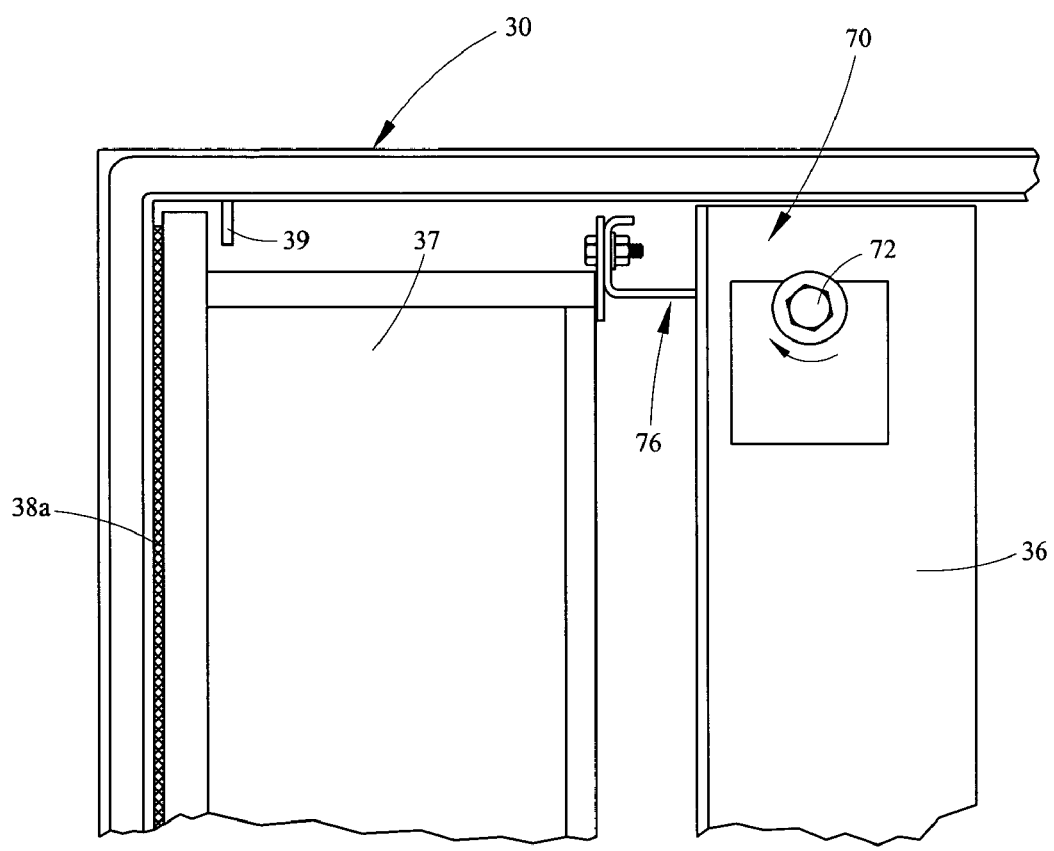
FIG. 9 is a side perspective view of the filter clamp assembly of FIG. 7 disposed in yet another position adjacent the secondary filter.
Figure 10:
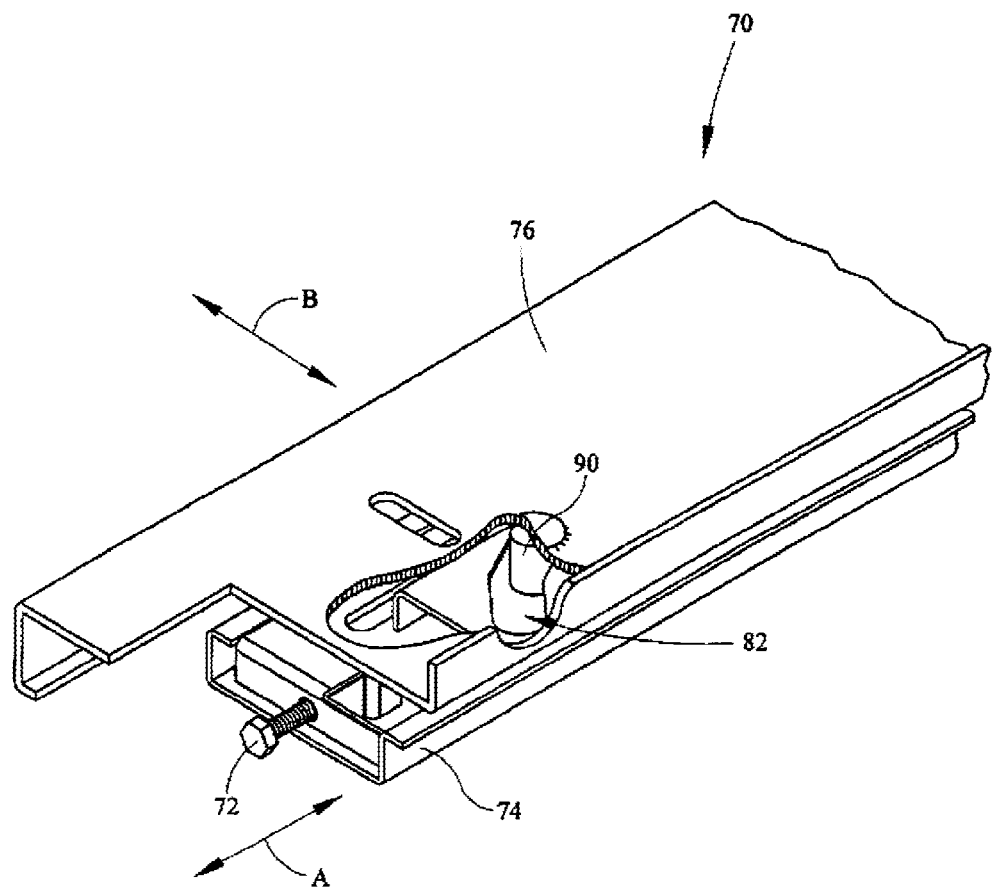
FIG. 10 is a top perspective view of the filter clamp assembly of FIG. 7 removed from the filtering cabinet and shown in a first position.
Figure 11:
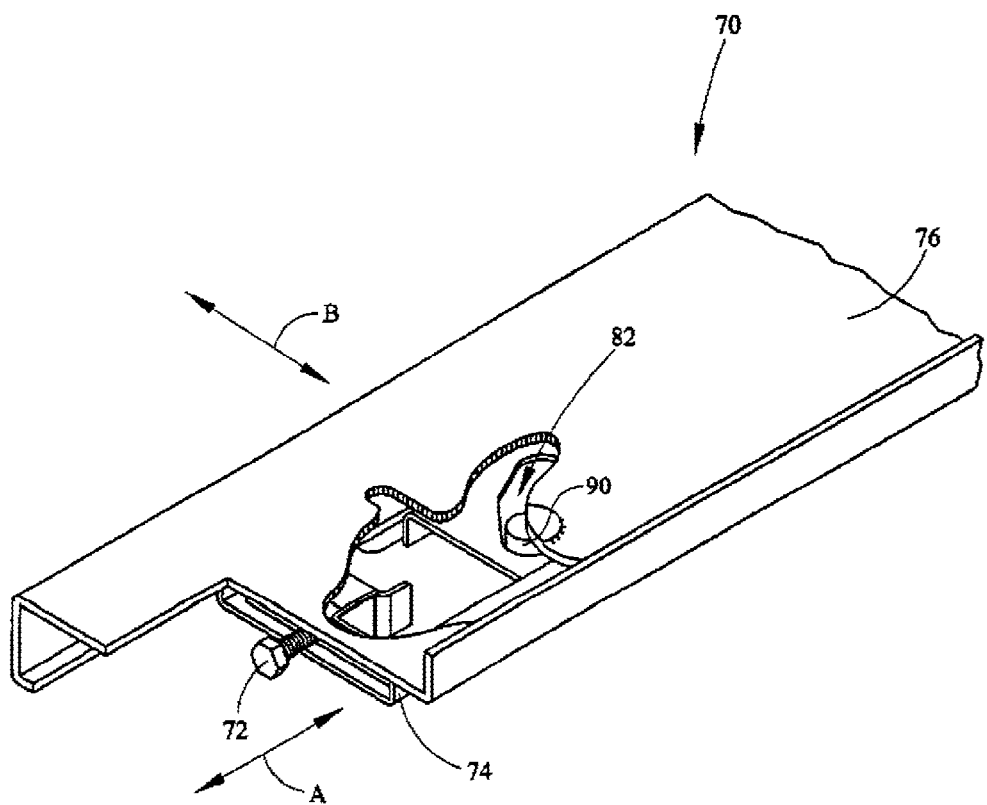
FIG. 11 is a top perspective view of the filtering clamp of FIG. 10 shown in a second position.

Referring now to FIGS. 7-12, a drive assembly sealing mechanism or clamp assembly 70 is shown for positively sealing the second-stage filter 37 against the cabinet 30. To inhibit passage of air around the second-stage filters 37, a seal is created between the second-stage filter 37 and the cabinet 30 to inhibit leakage by positioning a sealing gasket there between. The second-stage filter 37 utilizes the gasket material 38a along the header 38 which engages the inner structure of the filtration cabinet 30 to provide a proper seal and forces airflow through the second-stage filter 37. In order to seal the gasket 38a material against the inner cabinet surface, the drive assembly sealing mechanism 70 has been developed for use in the present filtration assembly 10. The drive assembly sealing mechanism 70 functions to convert rotational movement of at least one bolt 72, into a first horizontal movement of a slide 74 and a second horizontal movement including a net movement perpendicular to the first horizontal movement in order to move a clamp 76, and engage the second-stage filter 37. As shown in FIGS. 7-9, the at least one bolt 72 is positioned through the vertical support 36. A clamp assembly 70 is utilized along the upper and lower edges of each filter 37 in order to place a force along upper and lower edges of the second-stage filter 37. Thus one bolt 72 is utilized with each clamp assembly 72 for example, the one bolt 72 is located at the top of the vertical support 36 to engage the upper edge of the filter 37, a second bolt is located adjacent the bottom portion second-stage filter 37. A third bolt is located beneath the second bolt for engaging the upper portion of the lower second-stage filter and a fourth bolt, which is not shown, is located at the bottom of the vertical beam to engage a lower portion of the lower second-stage filter. In use, the at least one bolt 72 is rotated in the clockwise direction, in order to cause the clamp 76 to engage the filter 37. Further rotation moves the filter 37 toward the cabinet sidewall causing engagement between the gasket and cabinet 30 sidewall. Further rotation in the clockwise direction causes sealing engagement between the filter gasket, filter, and cabinet 30. FIGS. 7-9 depict the clamp 76 moving toward and engaging the filter 37 and bolt 72 is rotated.

Figure 12:
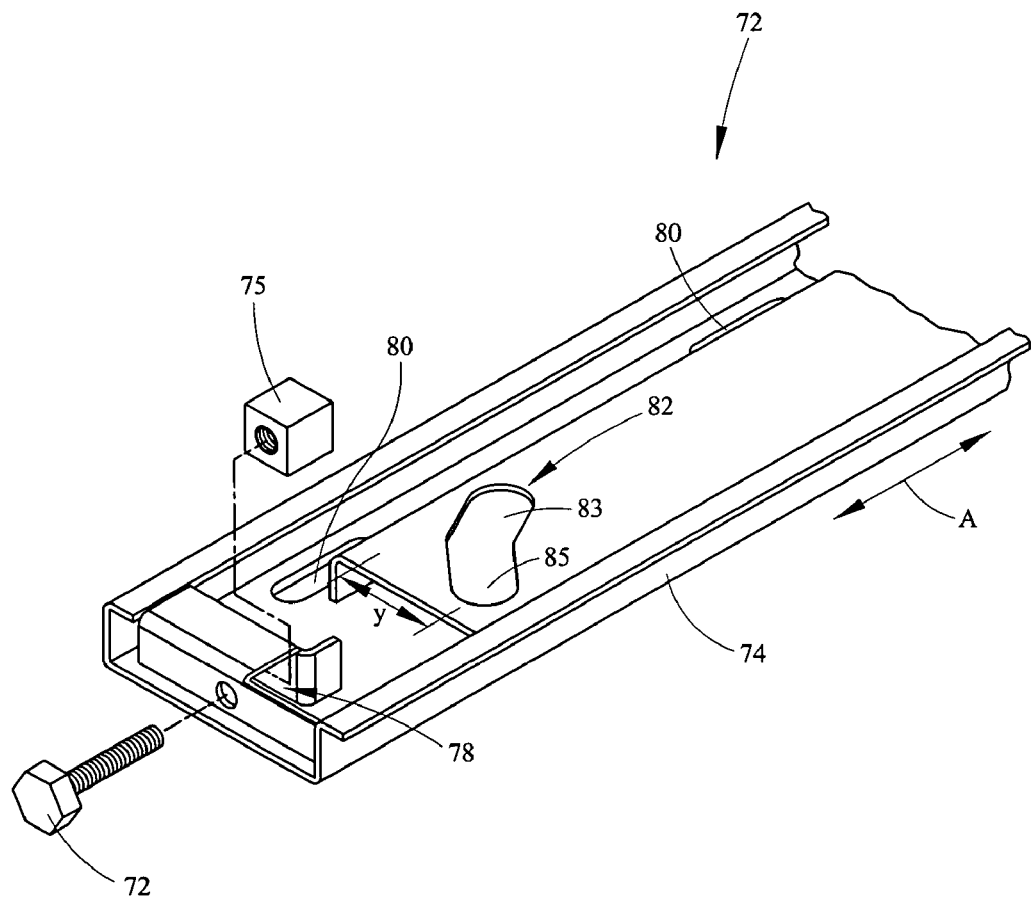
FIG. 12 is a top perspective of the slide with clamp removed for clarity.

Referring now to FIG. 12, the slide 74 is shown with the clamp 76 removed and exposing the interior portions of the slide 74. The slide 74 of the exemplary embodiment is generally channel shaped. At one end of the slide 74 is the adjustment bolt 72 extending through an aperture m the slide 74. On a backside of the bolt aperture is a brass retainer 75 shown in exploded fashion in FIG. 12. The retainer 75 includes at least one helical thread extending there through. The retainer 75 is captured within a retainer pocket 78 inhibiting rotation of the retainer 75 when the bolt 72 turns. On a rearside of the vertical support 36, the bolt 72 includes at least one washer and a lock-nut which retain the bolt 72 in place relative to the cabinet 30. The retainer 75 receives the adjustment bolt 72 but the retainer 75 cannot rotate. Thus, the rotation of the bolt 72 is translated to the slide 74 in the formed of linear motion along the axis of the bolt 72 due to the engagement between the bolt threads and the retainer threads 75 and the slide 74.

Referring still to FIG. 12, the slide 74 comprises at least one slot 80 to guide the slide in a first direction as indicated by the arrow. The at least one slot 80 functions to guide the slide during linear motion created by rotation of the bolt 72. In other words, the at least one slot 80 allows linear movement of the slide 74 when the bolt 72 is rotated.

The slide 74 also comprises at least one angled camming slot 82 which functions to convert the linear motion of the slide 74 to a second translational motion for the clamp 76. The second translational motion includes movement perpendicular to slide movement "A" causing the clamp 76 to engage the filter 37 and provide a sealing engagement. This perpendicular motion is indicated in FIG. 12 as movement "Y". In order to achieve the operable engagement and translational movement, the angled camming slot 82 comprises a first portion 83 and a second portion 85 disposed at an angle to the first portion 83 and within the same horizontal plane. The angled camming slot 82 receives a stud 90 depending from the clamp 76. The stud 90 may further comprise a friction reducing member such as a linear bearing or the like to reduce friction between the stud 90 and the angled camming surface 82.

Referring back to FIGS. 10 and 11, a cut-away view of the clamp assembly 70 is shown revealing the engagement between a stud 90 and the angled camming slot 82. The clamp 76 utilizes the studs 90 which may have roller bearings or other friction reduction means sized to fit within the angled camming slot 82. As the bolt 72 is turned with a ratchet for example, the rotational movement of the bolt 72 is translated by the retainer 75 and pocket 78 design into linear movement of the slide 74. The stud 90 and clamp 76 disposed within the angled cam slot 82 provides for net translational movement of the clamp 76 in a direction substantially perpendicular to the linear movement of the slide 74. This perpendicular movement of the clamp 76 causes engagement between the clamp 76 and the second-stage filter 37 and causes the filter 37 and gasket 38a to engage the cabinet 30. Such engagement provides a tight seal inhibiting air passage around the second-stage filter 37 and provides proper operation of the filtration apparatus.

Referring to FIGS. 4-6, a chamfered edge of a lip is shown extending from an upper surface of the clamp 76 near the retrieval rod 54. The chamfered edge is formed in such a manner as to inhibit locking or interference with the retrieval rod finger 56 against the lip as would occur if that edge were instead vertical.

With reference still now to 46, the aforementioned first and second tracks 34, 35 are all disposed within the first section of the filtration cabinet 30 behind the door 32 shown as open in FIGS. 4-6. Adjacent this first section (to the left) is a second section having a similar door and housing a third filter area or a HEPA filter section for filtering of nuclear, bacterial, viral, or other biological particulate or contaminants from the air system. Accordingly, the HEPA filter utilizes a finer mesh filter in order to screen smaller particles including the aforementioned biological contaminants. The HEPA filter section is similar to the second-stage track 35 previously described. One substantial difference with the HEPA filter system is that the HEPA header channel is sized so that a worker may not install a second-stage filter in the HEPA filter section or vice-versa.

Figure 13:
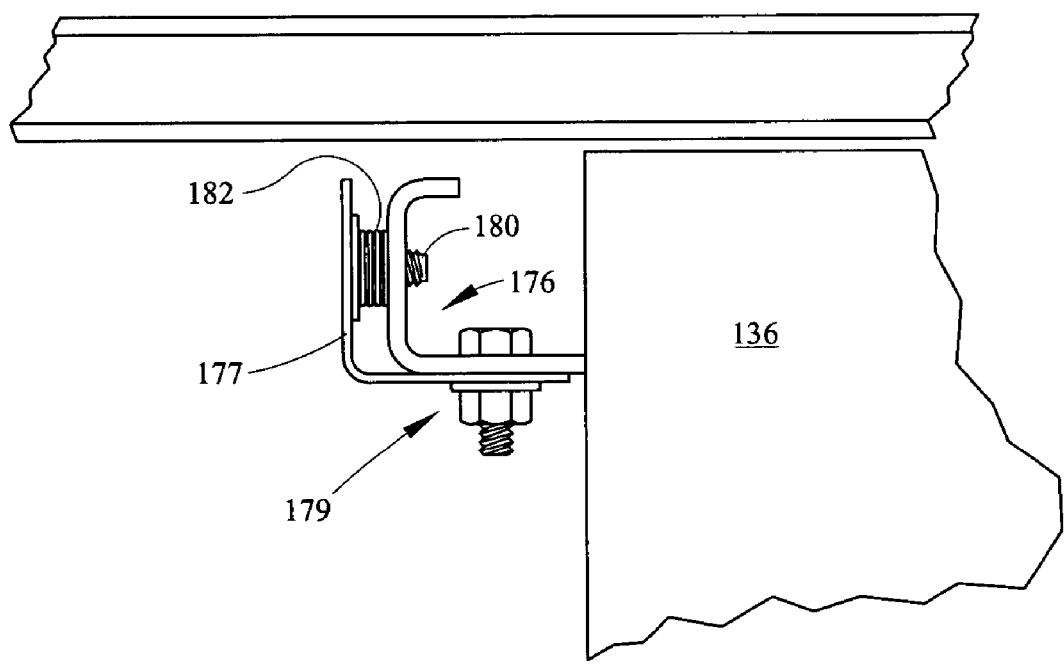
FIG. 13 is a side perspective view of the clamp assembly.

A second difference in the HEPA filter section of the filtration cabinet involves the clamping structure which engages the HEPA filter. While light leakage in the first and second-stage portions of the filtration cabinet is undesirable but slightly tolerable, such leakage at the HEPA filter is intolerable during operation. Thus, it is extremely important to insure an equal force is transmitted by the clamp against the edges of the HEPA filter so that proper sealing along the opposed gasket edge of the filter occurs at the cabinet. With reference now to FIG. 13, in order to provide this equal force along the interface between a HEPA clamp 176 and the HEPA filter, a spring mounted angle iron or other member 177 is positioned along a HEPA clamp 176 to compensate for any differences in force along the linear engagement edge of the clamp 176, thus applying even force across the filter header. The clamp 176 is substantially similar to the clamp 76 utilized with the second-stage filter 37.

Figure 14:
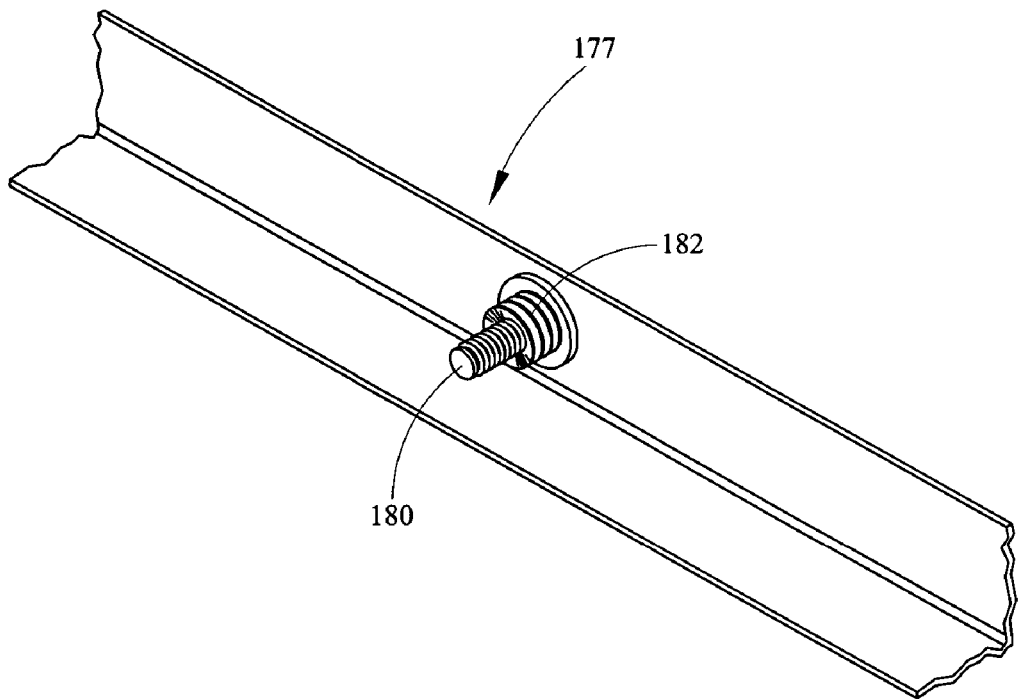
FIG. 14 is an angle with cupped washers for use with a third stage HEPA filter.

Referring to FIGS. 13 and 14, the angle iron 177 is positioned along the engagement edge of the clamp 176 of the HEPA filter track providing for engagement between the HEPA filter and angle iron 177. The angle iron 177 utilizes a first fastener 179 to connect to the clamp 176 along a lower horizontal portion of the angle iron 177. Extending from a second vertical surface of the angle iron 177 is at least one second fastener 180 having at least one elastic member 182 operably engaged therewith. Preferably, the at least one fastener 180 is comprised of a plurality of fasteners 180 spaced apart along the vertical portion of the angle iron 177 reducing point force loading of the angle iron on the HEPA filter and instead providing an equal application of force along the HEPA filter for proper sealing.

Figure 17:
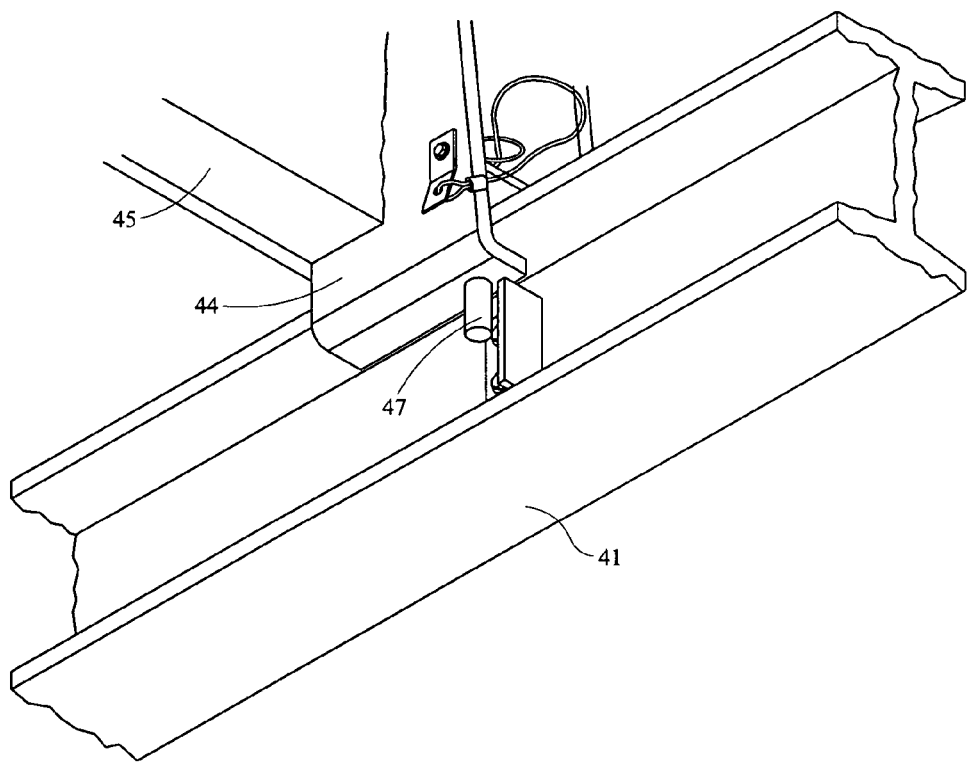
FIG. 17 is a side perspective view of the integrated jib extending through a first jib retainer in the fan cabinet of FIG. 15.
Figure 18:
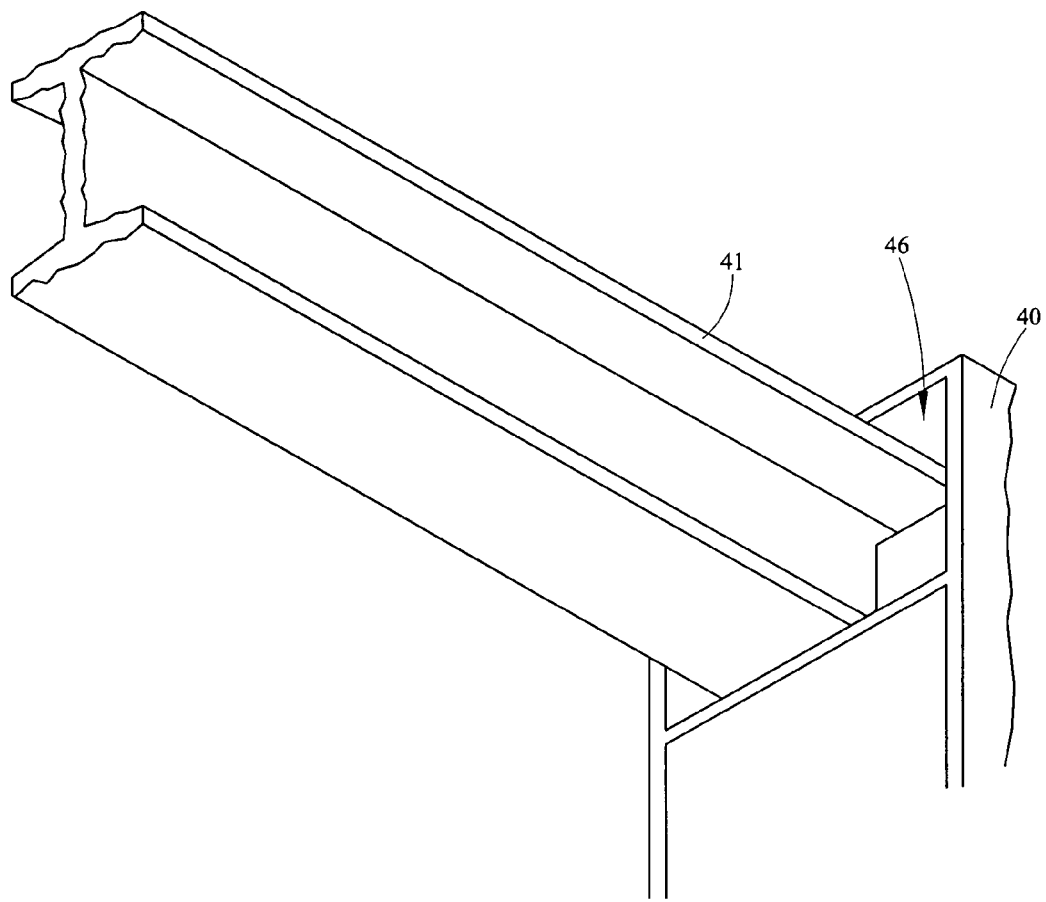
FIG. 18 is a side perspective view of the integrated jib positioned in a second jib retainer of the third cabinet housing.
Figure 19:
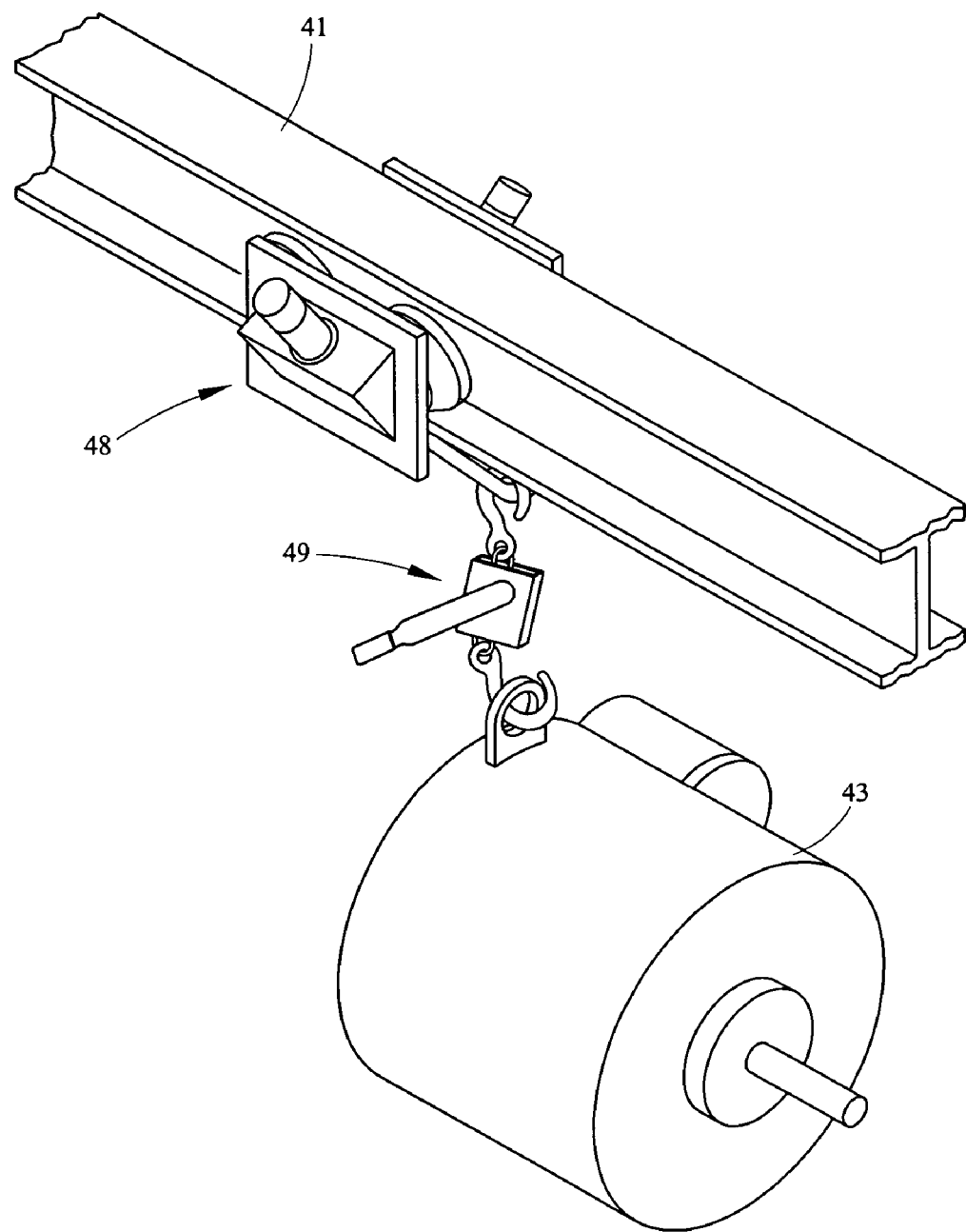
FIG. 19 is a side perspective view of the integrated jib with trolley and hoist mounted thereto; and, FIG. 20 is a side perspective view of an alternative embodiment of the present invention utilizing a vertical filtering system.

With reference to FIGS. 15-18, the fan-housing cabinet 40 is depicted comprising an integrated jib 41. The fan-housing cabinet 40 comprises a fan 42 and motor 43 for producing airflow through the multi-stage filtering apparatus 10. The housing 40 includes upper and lower surfaces and four sides defining the housing 40. The integrated jib 41 includes a housing bracket or first jib retainer 44 at a first door opening frame 45 and includes a jib pocket or second jib retainer 46 formed in the opposite wall of the cabinet 40. The bracket 44 includes a pin 47 extending downwardly through a beam flange. Referring now to FIG. 19, depending from the jib 41 may be a trolley 48 and hoist 49 may be for vertically lifting the fan motor 43 and removing the motor 43 from the housing cabinet 40.

Figure 15:
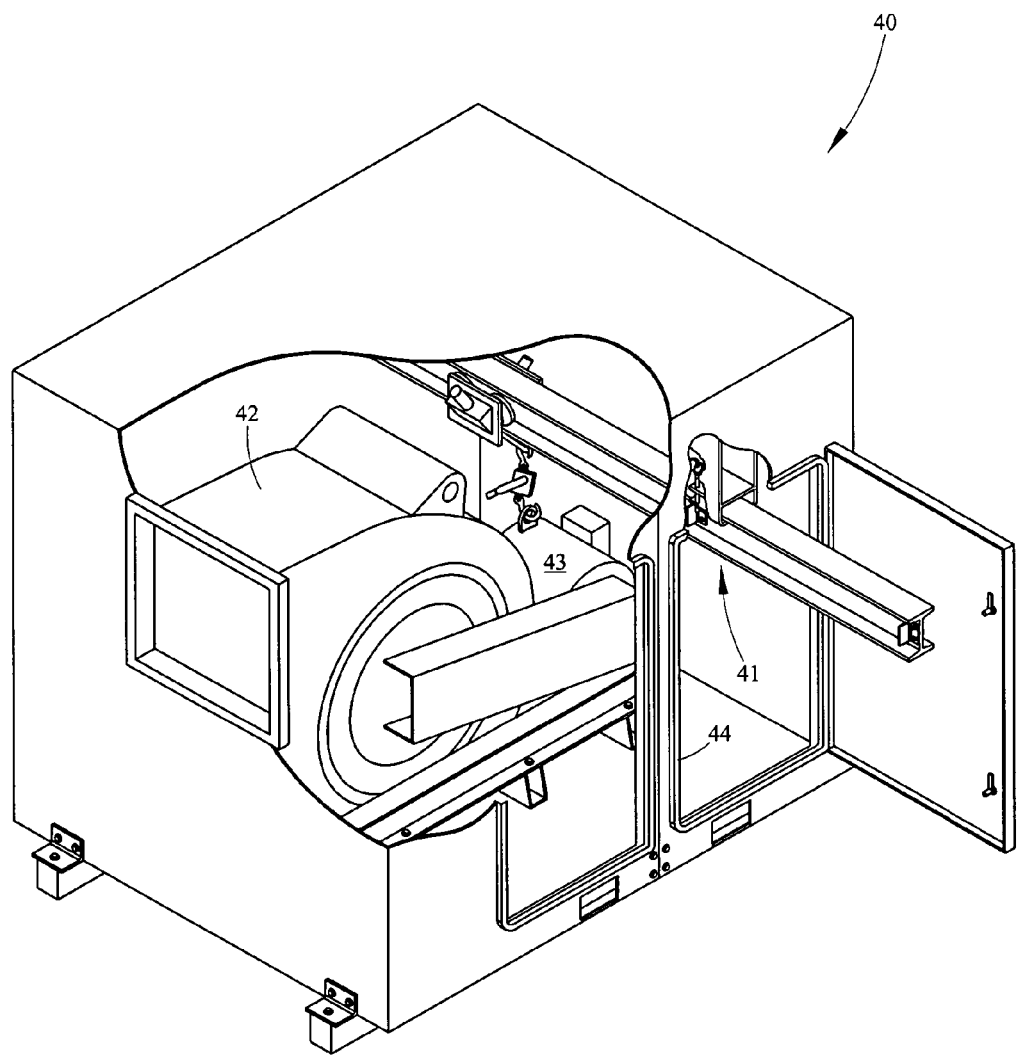
FIG. 15 is a side perspective view of the interior of the third fan cabinet of FIG. 1 with the integrated jib of the present invention.
Figure 16:
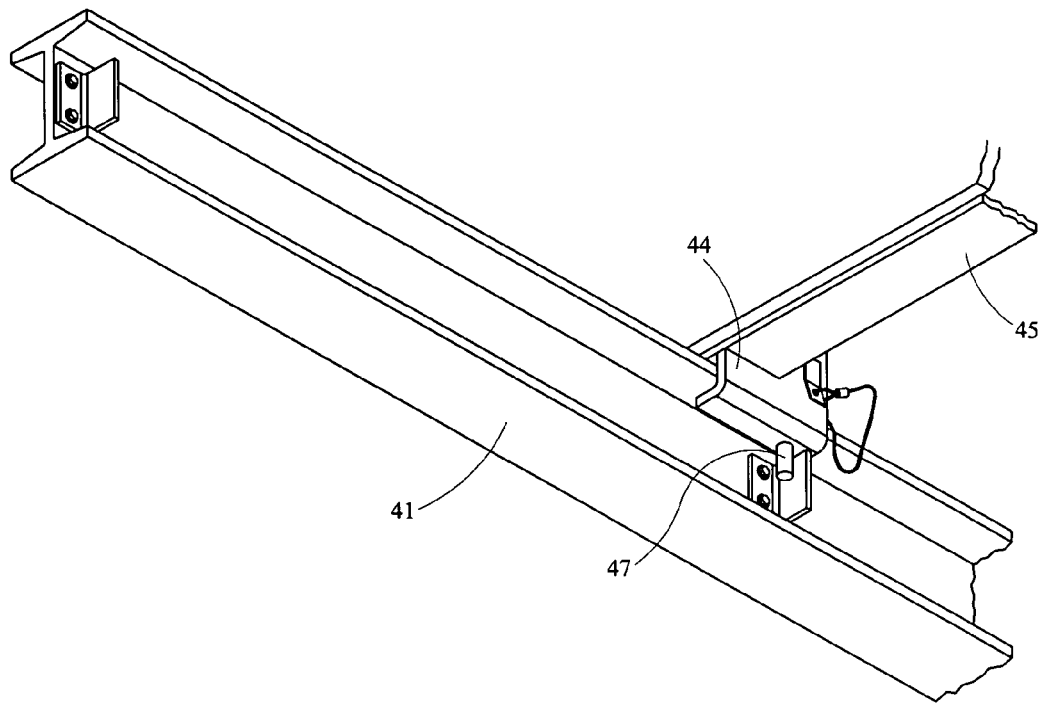
FIG. 16 is a lower perspective view of the integrated jib of FIG. 15.

Referring still to FIGS. 15-17, the bracket 44 is shown in the upper framing of the door opening 45 through which the jib 41 may be slidably disposed. As shown in Figures is formed in the fan housing wall 40 opposite the door and brackets, previously described, to receive the beam so that the beam is supported at one end within a pocket and within a second end by the bracket. A pin 47 may be positioned through the jib 41 and bracket in order to lock the beam in position once the jib 41 is disposed across the fan housing 40 and into the jib pocket 46 (FIG. 18). FIG. 19 depicts the trolley 48 and the hoist 49 depending from the jib 41 and engaging the fan motor 43 for lifting the motor and slidably removing the motor 43 from the housing 40.

It is apparent that variations may be made to the filtration apparatus of the present invention in regards to specific design elements thereof. Such variations however are deemed to fall within the teachings of the present invention as generally modifications may be made to placement of the particular structure described herein while falling within the general teachings hereof.

We claim:

1. A clamping assembly for a filtration apparatus, comprising:
   a slide operably engaging an adjustment bolt extending through a filtration cabinet, said slide having a camming slot, said slide extending substantially a depth of said filtration cabinet;
   a clamp operably engaging said camming slot in said slide, said clamp extending substantially a depth of said filtration cabinet;
   said clamping assembly converting rotational adjustment of said adjustment bolt into a linear motion of said clamp relative to said slide for engaging a filter.

2. The clamping assembly for a filtration apparatus of claim 1, said camming slot in said slide being angled.

3. The clamping assembly for a filtration apparatus of claim 2, said angled camming slot receiving a stud depending from said clamp.

4. The clamping assembly for a filtration apparatus of claim 3, said stud having a linear bearing.

5. The clamping assembly for a filtration apparatus of claim 1, said slide further comprising a retainer receiving said adjustment bolt.

6. The clamping assembly for a filtration apparatus of claim 1 wherein rotation of said adjustment bolt causes a first linear motion of said slide.

7. The clamping assembly for a filtration apparatus of claim 6 wherein said first linear motion of said slide causes a second linear motion of said clamp.

8. The clamping assembly for a filtration apparatus of claim 7 wherein said first linear motion is perpendicular to a component of said second linear motion.

9. The clamping assembly for a filtration apparatus of claim 7, said second linear motion clamping a filter in position within a filtration cabinet.

10. A clamping assembly for a filtration apparatus, comprising:
    a clamp extending substantially a depth of a filtration cabinet slidably positioned on and having a stud operably engaging a camming slot in a slide, said slide extending substantially a depth of said filtration cabinet;
    an adjustment bolt threadably connected to said slide wherein rotation of said adjustment bolt causes a first linear motion of said slide;
    said first linear motion causing a second linear motion of said clamp for engaging a filter.

11. A filtration apparatus having a clamping assembly, comprising:
    a filtration cabinet having a depth and at least one track for positioning a plurality of filters substantially extending said depth of said filtration cabinet;
    said filtration cabinet having an inlet and an outlet;
    an adjustment fastener extending through said filtration cabinet and threadably engaging a slide, said slide substantially extending said depth of said filtration cabinet;
    said slide having a camming slot operably engaging a stud on a clamp wherein said clamp engages a filter with rotation of said adjustment fastener, said engagement substantially extending a depth of said filter.

12. The clamping assembly of claim 1 wherein said linear motion is both lateral and longitudinal.

13. The clamping assembly of claim 10 wherein said first linear motion is a longitudinal motion and said second linear motion is a lateral motion.

14. The filtration apparatus of claim 11 wherein said clamping assembly converts said rotation of said adjustment fastener into a linear motion of said clamp relative to said slide for engaging said filter.

* * * * *